US012553434B2

(12) United States Patent
Kim

(10) Patent No.: US 12,553,434 B2
(45) Date of Patent: Feb. 17, 2026

(54) COMPRESSOR ASSEMBLY, AIR SUPPLY SYSTEM, VEHICLE

(71) Applicant: ZF CV SYSTEMS EUROPE BV, Brussels (BE)

(72) Inventor: Han Su Kim, Gyeonggi-do (KR)

(73) Assignee: ZF CV SYSTEMS EUROPE BV, Brussels (BE)

( * ) Notice: Subject to any disclaimer, the term of this patent is extended or adjusted under 35 U.S.C. 154(b) by 54 days.

(21) Appl. No.: 18/701,359

(22) PCT Filed: Oct. 4, 2022

(86) PCT No.: PCT/EP2022/077517

§ 371 (c)(1),
(2) Date: Apr. 15, 2024

(87) PCT Pub. No.: WO2023/061797

PCT Pub. Date: Apr. 20, 2023

(65) Prior Publication Data

US 2025/0243858 A1 Jul. 31, 2025

(30) Foreign Application Priority Data

Oct. 15, 2021 (CN) ......................... 202111202363.X

(51) Int. Cl.
*F04B 51/00* (2006.01)
*F04B 35/04* (2006.01)
(Continued)

(52) U.S. Cl.
CPC .............. *F04B 51/00* (2013.01); *F04B 35/04* (2013.01); *F04B 39/06* (2013.01); *F04B 49/10* (2013.01); *G07C 5/0825* (2013.01)

(58) Field of Classification Search
CPC .......... F04B 51/00; F04B 35/04; F04B 39/06; F04B 49/10; G07C 5/0825
See application file for complete search history.

(56) References Cited

U.S. PATENT DOCUMENTS 11,359,568 B1 * 6/2022 Oshinsky .............. F02D 41/126
2005/0029976 A1 2/2005 Terry et al.
(Continued)

FOREIGN PATENT DOCUMENTS

CN 105484974 A 4/2016
CN 208920483 U 5/2019
(Continued)

OTHER PUBLICATIONS

International Search Report for PCT/EP2022/077517 dated Dec. 5, 2022, 4 pages.
(Continued)

*Primary Examiner* — Hussein Elchanti
(74) *Attorney, Agent, or Firm* — WARNER NORCROSS + JUDD LLP

(57) ABSTRACT

A compressor for a commercial vehicle comprises:
- a plurality of cylinders, wherein each cylinder accommodates a reciprocating piston, wherein the reciprocating piston is driven by a crankshaft, and
- a plurality of cooling means, arranged at a cylinder head region of the cylinder, wherein one specific cooling means is assigned to one cylinder respectively.

Figure 1A:
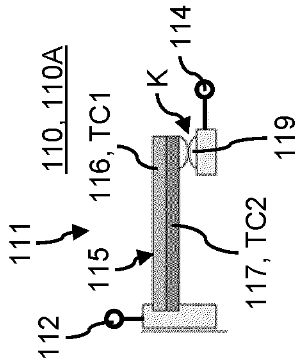

The compressor assembly comprises a sensor network, wherein the sensor network comprises a plurality of temperature sensitive switches, wherein
- each temperature sensitive switch is assigned to a cylinder.

14 Claims, 5 Drawing Sheets

(51) Int. Cl.

| | |
|---|---|
| ***F04B 39/06*** | (2006.01) |
| ***F04B 49/10*** | (2006.01) |
| ***G07C 5/08*** | (2006.01) |

(56) References Cited

U.S. PATENT DOCUMENTS

| | | | | |
|---|---|---|---|---|
| 2016/0298551 | A1* | 10/2016 | Matsumoto ............. | F02B 63/02 |
| 2018/0119595 | A1* | 5/2018 | Villegas Muriel ........ | F01P 1/06 |
| 2019/0055935 | A1 | 2/2019 | Ohata | |
| 2019/0234291 | A1* | 8/2019 | Cunningham ............ | F01P 7/04 |
| 2019/0264600 | A1* | 8/2019 | Loof ....................... | F01P 7/165 |
| 2025/0243858 | A1* | 7/2025 | Kim ........................ | F04B 35/04 |

FOREIGN PATENT DOCUMENTS

| | | | |
|---|---|---|---|
| EP | 3128172 | A1 | 2/2017 |
| JP | H0988819 | A | 3/1997 |
| WO | 2021155923 | A1 | 8/2021 |

OTHER PUBLICATIONS

Machine assisted English translation of CN105484974A obtained from https://worldwide.espacenet.com/patent on Apr. 10, 2024, 10 pages.

Machine assisted English translation of CN208920483U obtained from https://worldwide.espacenet.com/patent on Apr. 10, 2024, 11 pages.

Machine assisted English translation of JPH0988819A obtained from https://worldwide.espacenet.com/patent on Apr. 10, 2024, 12 pages.

* cited by examiner

COMPRESSOR ASSEMBLY, AIR SUPPLY SYSTEM, VEHICLE

CROSS-REFERENCE TO RELATED APPLICATIONS

This application is the U.S. National Stage of PCT/EP2022/077517 filed on 4 Oct. 2022, which claims priority to Chinese Patent Application No. 202111202363.X filed on 15 Oct. 2021, the content of which is incorporated herein by reference.

The invention relates in a first aspect to a compressor assembly for a commercial vehicle according to the preamble of claim 1. The invention further relates in a second aspect to an air supply system and in a third aspect to a vehicle comprising a compressor assembly according to the first aspect and/or an air supply system according to the second aspect of the invention.

Compressors and compressor assemblies for commercial vehicles are generally well known. Compressor assemblies comprise at least one compressor, such as a reciprocating compressor, for providing pressurized air to an air supply system and/or other pneumatic systems of the vehicle.

Regarding compressor assemblies, it is generally desirable to obtain a reliable and safe operation. During the operation of a compressor assembly, it is desirable to detect unfavorable operating conditions and faults at an early stage to prevent downtime and/or further damage of the compressor assembly.

CN210290104U describes in a general manner a diagnosis system for a piston of a reciprocating compressor, and specifically relates to the technical field of compressor piston diagnosis, including a controller. The system described therein is adapted to detect the temperature of a piston activity environment through a temperature sensor.

Despite such generally favorable approaches, compressors and compressor assemblies can still be improved, in particular with respect to reliability and with respect to an effective monitoring means.

It is therefore desirable to address at least one of the above problems.

This is where the invention comes in, with the object to specifically improve compressor assemblies with respect to reliability and with respect to an effective monitoring means.

In accordance with the invention, the object is solved in a first aspect by a compressor assembly as proposed according to claim 1. In accordance with the invention, a compressor assembly is proposed, in particular for a commercial vehicle, comprising a plurality of cylinders, wherein each cylinder accommodates a reciprocating piston, wherein the reciprocating piston is operatively coupled to a crankshaft, and a plurality of cooling means, preferably a plurality of fans, arranged at a cylinder head region of the cylinder, wherein one specific cooling means is assigned to one cylinder respectively.

According to the invention, it is proposed that the compressor assembly comprises a sensor network, comprising a plurality of temperature sensitive switches, wherein each temperature sensitive switch is assigned to a cylinder, and each temperature sensitive switch comprises a first electric terminal and a second electric terminal and is adapted to switch from a closed position to an open position, in which an electric connection between the first electric terminal and the second electric terminal is interrupted when a switch temperature at the temperature sensitive switch is exceeded, and the sensor network is adapted to provide an overheat signal when at least one temperature sensitive switch is in the open position.

The invention is based on the finding that a temperature sensitive switch, that is assigned to a cylinder, is an effective means of monitoring said cylinder and/or the compressor assembly. The invention has recognized that, by being adapted to interrupt the electric connection between the first and the second electric terminal when a switch temperature is reached or exceeded, such temperature sensitive switch is a simple but effective detecting means. In other words, the temperature sensitive switch provides a simple but effective detecting function that indicates whether the switch temperature has been reached or exceeded by interrupting said electric connection.

Because the temperature sensitive switch is assigned to a cylinder, a possible fault in or at the piston and/or the cylinder can be detected in a relatively early stage, in particular because such fault will result in an increased temperature in the region of the cylinder. Such fault can be, among other things, the failure of a cooling means assigned to the corresponding cylinder. By detecting such fault in an early stage, further damage of the compressor can be prevented.

A temperature sensitive switch advantageously provides a relatively simple temperature sensing means, in particular because no sophisticated signal processing equipment is required. There is an open position and a closed position of the temperature sensitive switch, wherein an electric connection is established when the closed position is engaged. Therefore, it can be determined whether a switch temperature has been reached or exceeded in dependence of the presence of a measurement current and/or measurement voltage.

The sensor network is therefore adapted to detect whether a switch temperature at a cylinder has been reached or exceeded. This is particularly advantageous for determining whether the cooling means at the corresponding cylinder is functioning properly.

A sensor network in this context is considered any configuration comprising at least two temperature sensitive switches that are connected in the form of an electric circuit and that is adapted to provide an overheat signal when at least one temperature sensitive switch is in the open position.

Further developments of the invention can be found in the dependent claims and show particularly advantageous possibilities to realize above described concept in light of the object of the invention and regarding further advantages.

Preferably, several or all reciprocating pistons are operatively coupled to the same crankshaft.

Preferably, an individual temperature sensitive switch is assigned to each cylinder of the compressor assembly. In such configuration, the sensor network comprises a temperature sensitive switch for each cylinder of the compressor assembly. Consequently, the temperature at each cylinder can be monitored. Preferably, the compressor assembly is a reciprocating compressor assembly. Preferably, the sensor network is adapted to provide an overheat signal if a measurement current and/or measurement voltage changes, in particular if a measurement current and/or measurement voltage is absent.

In preferred developments, the sensor network further comprises a first temperature sensing device configured to determine a motor temperature at a motor, in particular an electric motor, of the compressor assembly. In further preferred developments, the sensor network further comprises a second temperature sensing device, configured to determine a power electronics temperature at a power electronics unit of the compressor assembly. Preferably, the first temperature sensing device and/or the second temperature sensing device are configured as temperature sensitive switches, in particular so that they can be integrated into the sensor network along with the other temperature sensitive switches that are assigned to the cylinders. Preferably, the first temperature sensing device is configured as a temperature sensitive switch adapted to switch into an open position when a further switch temperature has been reached or exceeded. Preferably, the second temperature sensing device is configured as a temperature sensitive switch adapted to switch into an open position when an even further switch temperature has been reached or exceeded.

In a further preferred development, the compressor assembly comprises an electric motor, adapted to drive the crankshaft. Preferably, the temperature sensitive switch comprises a contact bridge, wherein the contact bridge comprises a first material layer with a first temperature coefficient, and a second material layer with a second temperature coefficient. The first and second material layers are preferably attached to each other resulting in an opening movement substantially perpendicular to the material layer when the temperature changes. In a further preferred development, the temperature sensitive switch is a bimetallic switch. Preferably, all temperature sensitives switches of the sensor network are bimetallic switches. Bimetallic switches are a simple and reliable means for detecting whether a switch temperature has been reached or exceeded. A bimetallic switch preferably comprises a first metallic material layer with a first temperature coefficient and a second metallic material layer with a second temperature coefficient.

A preferred development suggests that the switch temperature is defined to be in a range from 140° C. to 260° C., preferably from 180° C. to 220° C., more preferably 200° C. In other developments, deviating switch temperatures are possible. However, the ranges indicated above have been proven to reliably monitor the operation of the compressor assembly, in particular to indicate whether a cooling means at a specific cylinder has failed to operate.

In accordance with a further development, it is proposed that the temperature sensitive switch is arranged in the cylinder head region or between the cylinder head region and the cooling means. Arranging the temperature sensitive switch near the cylinder head region has the advantage of achieving a quick response to any increase in temperature in said cylinder head. Further, by being close to the cooling means, in particular to the fan, of a cylinder, a failure or fault of said cooling means can be detected by an increase in temperature through the temperature sensitive switch.

In a preferred development, the temperature sensitive switches of the sensor network are electrically connected in series, and the sensor network is configured to provide the overheat signal if a measurement voltage and/or a measurement current is not present at a measurement terminal. In such development, the temperature sensitive switches are preferably connected to each other in a serial electric circuit. Such development advantageously provides a simple yet reliable means of detecting a default or failure in the compressor assembly, in particular whether one or more cooling means have broken down.

In a preferred development, the temperature sensitive switches of the sensor network are electrically connected in parallel, wherein each temperature sensitive switch is arranged in a parallel branch of the sensor network, and a measurement terminal is arranged in one of the parallel branches, and the sensor network is configured to provide the overheat signal if a measurement current at the measurement terminal changes. In such development, the temperature sensitive switches are preferably connected to each other in a parallel electric circuit.

Preferably, at least two parallel branches comprise a resistor with a resistance, wherein a first resistance of a first resistor in a first parallel branch differs from a second resistance of a second resistor in a second parallel branch. Preferably, all parallel branches comprise a resistor, or all parallel branches except one parallel branch comprises a resistor. Preferably, each resistor has an individual resistance, differing from the resistance of all other resistors. Based on the principle of a current divider, it is advantageously possible to identify which parallel branch comprises a temperature sensitive switch that is in an open position. The term “resistance” is considered as a resistance value, preferably expressed in the unit “Ohm”, as a property of the corresponding resistor.

In accordance with a further development, it is proposed that the overheat signal is representative for the measurement current at the measurement terminal of the temperature sensitive switch where the switch temperature is exceeded. Preferably, the signal processing unit is configured to provide an individual overheat signal in dependence of a measurement current and/or measurement voltage that is determined at the measurement terminal. In such a development of the invention, it is advantageously possible to distinguish at which cylinder the switch temperature has been reached or exceeded. According to the measurement current and/or the measurement voltage, the according parallel branch comprising a temperature sensitive switch in an open position can be identified. In particular, this is achieved based on the current divider principle and according to the individual resistance values.

In a preferred development, the sensor network comprises an signal processing unit, adapted to provide the overheat signal in dependence of the measurement voltage and/or a measurement current, wherein preferably the signal processing unit is connected to an electronic control unit of the vehicle. In particular, the signal processing unit is adapted to provide an overheat signal if the measurement current and/or measurement voltage changes or if the measurement current and/or measurement voltage is absent. Preferably, the signal processing unit is adapted to provide an individual overheat signal assignable to a specific cylinder in dependence of the value of the measurement current and/or measurement voltage.

In a second aspect of the invention, an air supply system for a vehicle, comprising a compressor assembly according to the first aspect of the invention. Preferably, the air supply system comprises at least one pneumatic consumer, in particular a pneumatic brake system and/or an air suspension system and/or a sensor cleaning system.

In a third aspect of the invention, a vehicle, preferably commercial vehicle, is proposed, comprising a compressor assembly according to the first aspect of the invention and/or an air supply system according to the second aspect of the invention.

In a preferred development of the vehicle, an electronic control unit is proposed that is connected to the sensor network, in particular to a signal processing unit, and is adapted to receive an overheat signal and to provide an alarm indication via an alarm indication device, preferably to display an alarm message, in dependence of the overheat signal.

It shall be understood that the compressor assembly according to the first aspect of the invention, the air supply system according to the second aspect of the invention and the vehicle according to the third aspect of the invention comprise identical or similar developments, in particular as described in the dependent claims. Therefore, a development of one aspect of the invention is also applicable to another aspect of the invention.

These and other aspects of the invention will be apparent from and elucidated with reference to the embodiments described hereinafter. The embodiments of the invention are described in the following on the basis of the drawings in comparison with the state of the art, which is also partly illustrated. The latter is not necessarily intended to represent the embodiments to scale. Drawings are, where useful for explanation, shown in schematized and/or slightly distorted form. With regard to additions to the lessons immediately recognizable from the drawings, reference is made to the relevant state of the art. It should be borne in mind that numerous modifications and changes can be made to the form and detail of an embodiment without deviating from the general idea of the invention. The features of the invention disclosed in the description, in the drawings and in the claims may be essential for the further development of the invention, either individually or in any combination.

Figure 1B:
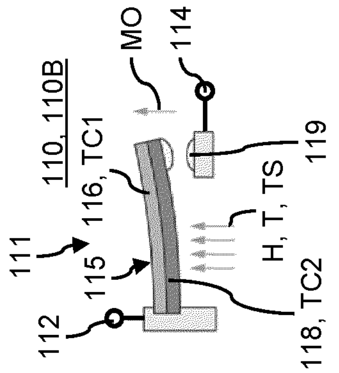
Figure 2A:
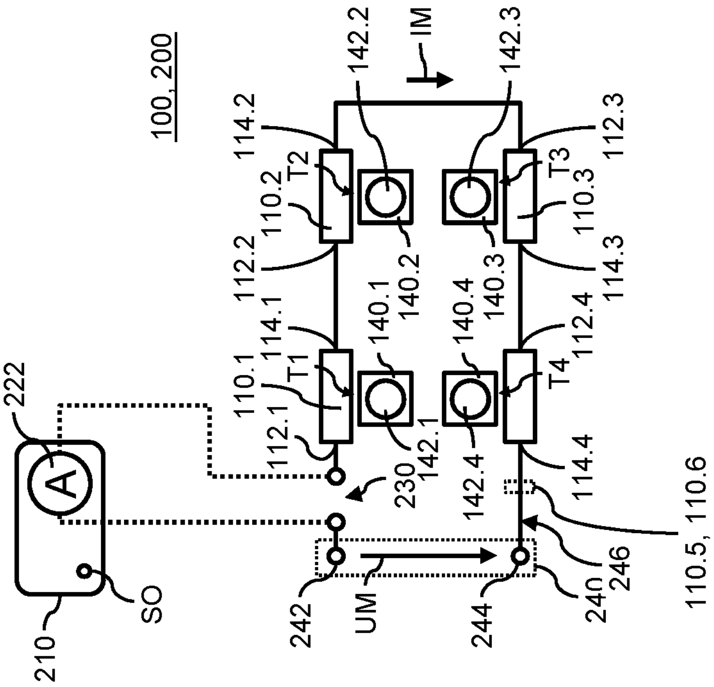
Figure 2B:
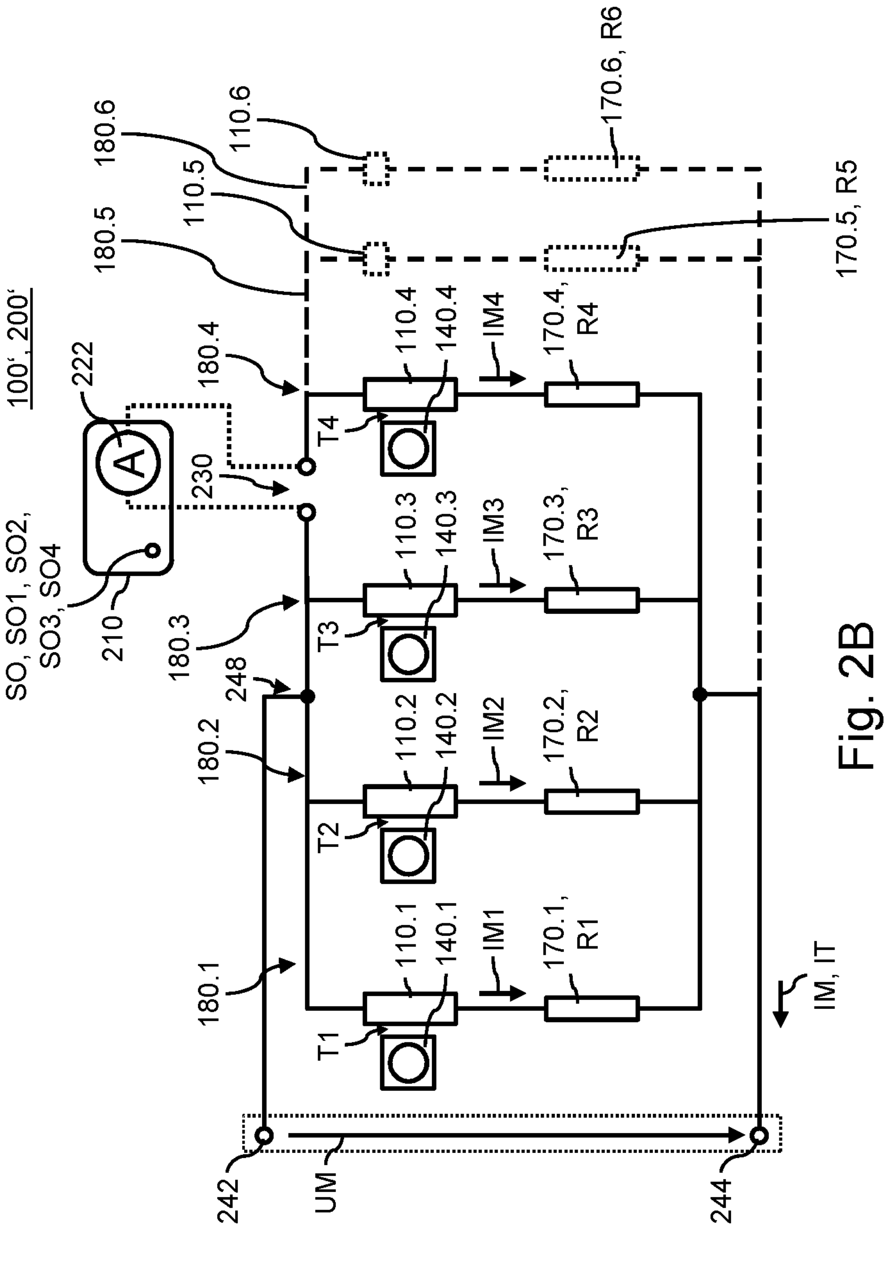
Figure 3A:
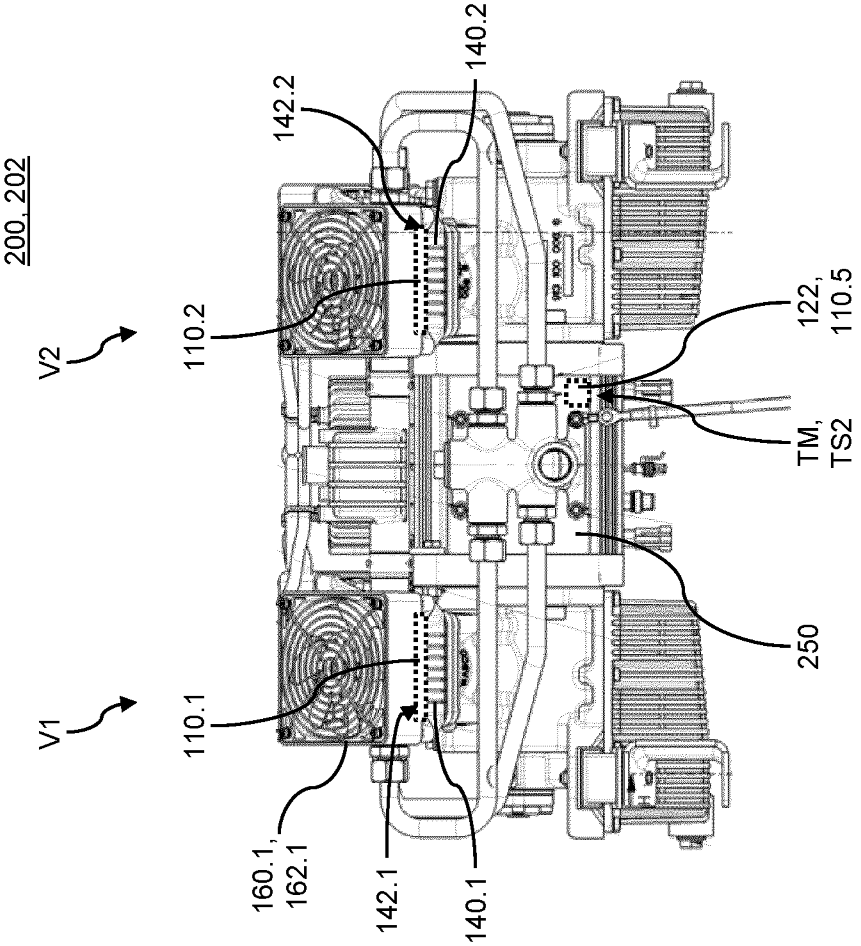
Figure 3B:
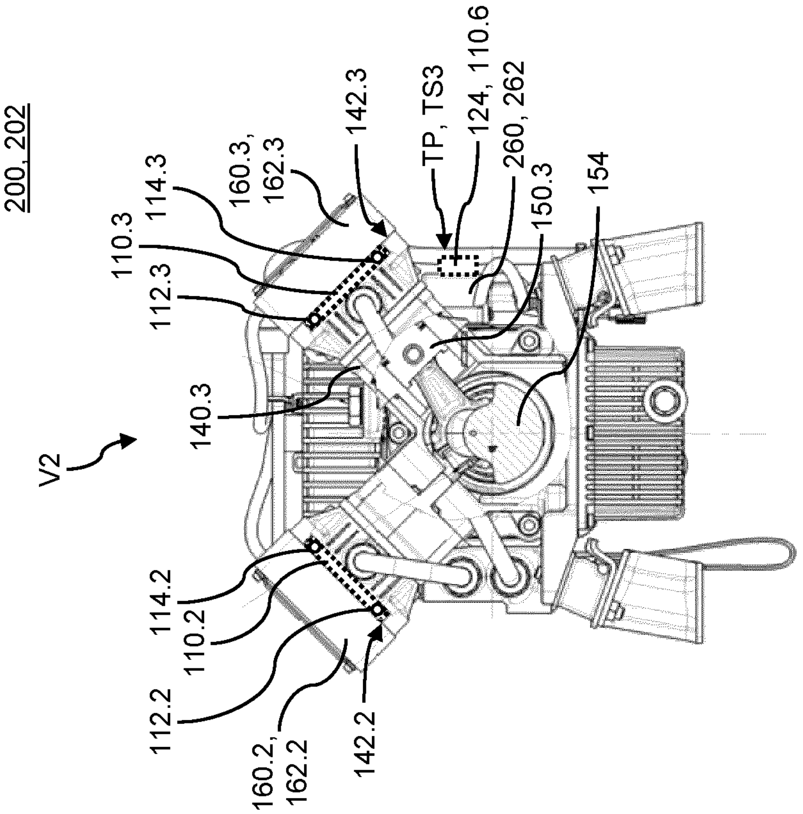
Figure 4:
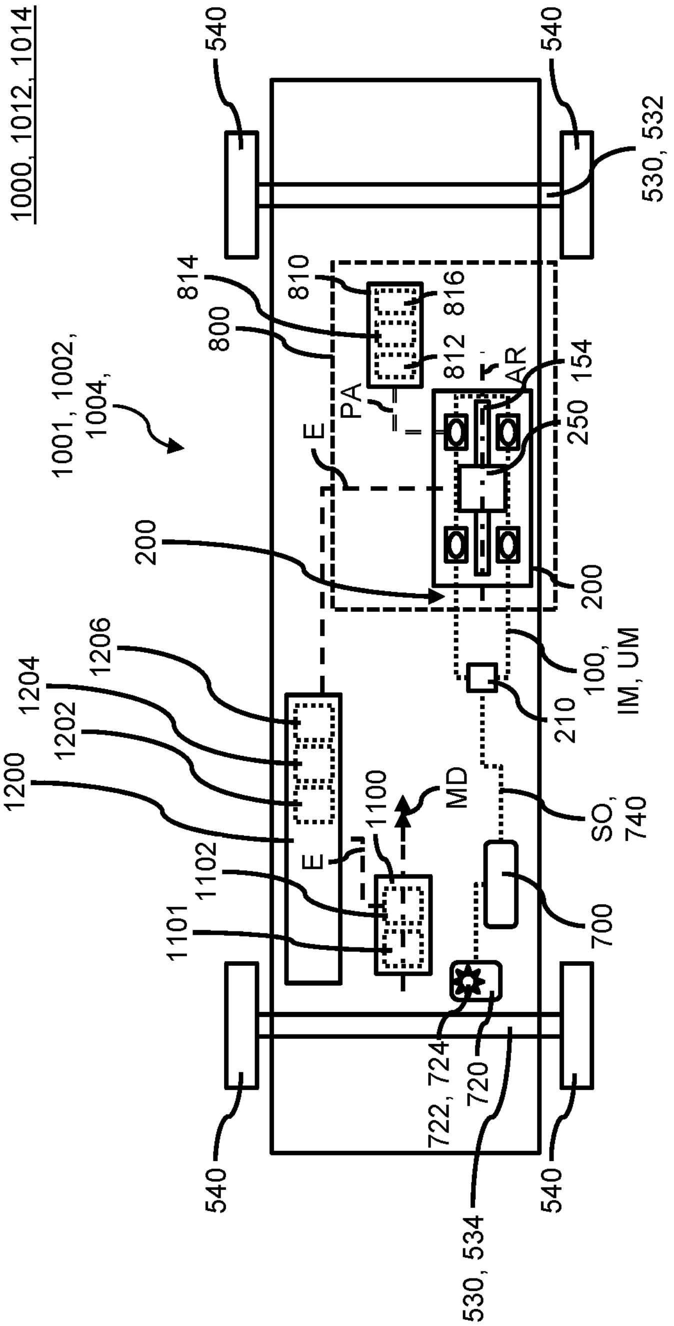

Further advantages, features and details of the invention result from the following description of the preferred embodiments as well as from the drawings, which show in:

FIG. 1A an illustration of a temperature sensitive switch in the form of a bimetallic switch in a closed position for an compressor assembly according to the first aspect of the invention, FIG. 1B an illustration of a temperature sensitive switch in the form of a bimetallic switch in an open position for an compressor assembly according to the first aspect of the invention, FIG. 2A a schematic illustration of a first preferred embodiment of a compressor assembly with a first sensor network, FIG. 2B a schematic illustration of a second preferred embodiment of a compressor assembly with a second sensor network, FIGS. 3A, 3B a front view and a side view of a compressor assembly according to the first aspect of the invention, which preferably can be configured as the first or the second preferred embodiment of the compressor assembly, FIG. 4 A schematic illustration of a vehicle according to the third aspect of the invention, comprising an air supply system according to the second aspect of the invention.

FIG. 1A shows an illustration of a temperature sensitive switch 110 in a closed position 110A. The temperature sensitive switch 110 comprises a contact bridge 115, adapted to electrically connect a first electric terminal 112 with a second electric terminal 114. The contact bridge 115 comprises a first material layer 116 with a first temperature coefficient TC1, and a second material layer 118 with a second temperature coefficient TC2. The first material layer 116 is attached to the second material layer 118, preferably by means of an adhesive or a welded connection, or by means of other bonding techniques such as rolling. The first material layer 116 and/or the second material layer 118 are preferably made of metallic materials. The contact bridge 115 is adapted to open and close an electric connection between the first electric terminal 112 and the second electric terminal 114 at a contact point K in dependence of a switch temperature TS. In the closed position 110A, the contact bridge 115 is in contact with a contact foundation 119, establishing an electric connection between the first electric terminal 112 and the second electric terminal 114. In other words, the contact point K is the point of contact between the contact bridge 115 and the contact foundation 119.

FIG. 1B shows the temperature sensitive switch 110 shown in FIG. 1A, but in an open position 110B. The open position 110B is established when a temperature T at the temperature sensitive switch 110, in particular at the contact bridge 115, reaches or exceeds the switch temperature TS, in particular due to a heat flow H. In particular, the heat flow H is emitted by a piston and/or cylinder of a compressor assembly not shown here. The heat flow H tends to increase when a cooling means (not shown in FIG. 1A and FIG. 1B), assigned to the same cylinder as the temperature sensitive switch 110, is not operating. The contact bridge 115 is adapted to lift from the contact foundation 118 in an opening movement MO. The contact bridge 115 is configured to perform the opening movement MO, since the second temperature coefficient TC2 is greater than the first temperature coefficient TC1, resulting in a bending of the contact bridge 150 in a direction that is substantially perpendicular to the contact bridge 115. A greater temperature coefficient TC means a greater expansion when subjected to heat. The greater the difference between the first temperature coefficient TC1 and the second temperature coefficient TC2, the greater the amplitude of the opening movement MO. Preferably, the switch temperature TS is in the range from 140° C. to 260° C., more preferably from 180° C. to 220° C., even more preferably 200° C.

The temperature sensitive switch 110 is in the form of a bimetallic switch 111. In other embodiments, the temperature sensitive switch 110 can be of another configuration, for example comprising other materials than metallic materials.

FIG. 2A shows a schematic illustration of a first preferred embodiment of a compressor assembly 100. The compressor assembly 100 comprises a first sensor network 200 with a plurality of four temperature sensitive switches 110, namely a first temperature sensitive switch 110.1, a second temperature sensitive switch 110.2, a third temperature sensitive switch 110.3 and a fourth temperature sensitive switch 110.4. Each temperature sensitive switch 110 shown here is configured as a bimetallic switch 111.

The temperature sensitive switches 110.1, 110.2, 110.3, 110.4 are connected in series by means of a serial electric circuit 246. This means, that a first electric terminal 112.1 of the first temperature sensitive switch 110.1 is connected to a first source terminal 242 of an electric source 240. A second electric terminal 114.1 of the first temperature sensitive switch 110.1 is connected to a first electric terminal 112.2 of the second temperature sensitive switch 110.2. A second electric terminal 114.2 of the second temperature sensitive switch 110.2 is connected to a first electric terminal 112.3 of the third temperature sensitive switch 110.3. A second electric terminal 114.3 of the third temperature sensitive switch 110.3 is connected to a first electric terminal 112.4 of the fourth temperature sensitive switch 110.4. A second electric terminal 114.4 of the fourth temperature sensitive switch 110.4 is connected to a second source terminal 244 of the electric source 240. Optionally, a fifth temperature sensitive switch 110.5 and/or a sixth temperature sensitive switch 110.6, or more temperature sensitive switches 110, can be additionally integrated, as indicated here.

The electric source 240 is adapted to provide a measurement voltage UM and/or a measurement current IM between the first source terminal 242 and the second source terminal 244. The first temperature sensitive switch 110.1 is assigned to a first cylinder 140.1 of the compressor assembly 200. Preferably, the first temperature sensitive switch 110.1 is located at or near the first cylinder 140.1, such as here between a first cylinder head region 142.1 of the first cylinder 140.1 and a first cooling means 160.1 (not shown here) assigned to the first cylinder 140.1. When a first temperature T1 reaches or exceeds the switch temperature TS, the first temperature sensitive switch 110.1 switches from a closed position 110A to an open position 1101B, such as described in FIG. 1A and FIG. 1B.

The above description referring to the first temperature sensitive switch 110.1 and the first cylinder 140.1 applies in an analog manner with corresponding numbering to the second, third and fourth temperature sensitive switch 110.2, 110.3, 110.4 as well as the second, third and fourth cylinder 140.2, 140.3, 140.4, respectively.

The sensor network 100 further comprises a signal processing unit 210, adapted to provide an overheat signal SO in dependence of the measurement voltage UM and/or the measurement current IM. In the embodiment shown here, the signal processing unit 210 is connected to the serial electric circuit 246 by means of a measurement terminal 230 and is adapted to detect the measurement current IM. The measurement terminal 230 is connected in series between the first source terminal 242 and the first electric terminal 112.1 of the first temperature sensitive switch 110.1.

The signal processing unit 210 is adapted to provide the overheat signal SO if no measurement current IM is detected. This is the case, if at least one of the temperature sensitive switches 110.1, 110.2, 110.3, 110.4 is in an open position 110B, because the corresponding temperature T1, T2, T3, T4 has reached or exceeded the switch temperature TS, and consequently the serial electric circuit 246 is interrupted.

FIG. 2B shows a second preferred embodiment of a further compressor assembly 100', comprising a further sensor network 200' with a parallel arrangement of temperature sensitive switches 110. Each temperature sensitive switch 110 is arranged in a parallel branch 180. In the embodiment shown, the sensor network 200' comprises a plurality of four temperature sensitive switches 110, namely a first temperature sensitive switch 110.1, second temperature sensitive switch 110.2, a third temperature sensitive switch 110.3 and a fourth temperature sensitive switch 110.4, each arranged in a corresponding first to fourth parallel branch 180.1, 180.2, 180.3, 180.4. The parallel branches 180.1, 180.2, 180.3, 180.4 together form a parallel electric circuit 248. Optionally, the further sensor network 200' can comprise further parallel branches 180, such as a fifth parallel branch 180.5 with a fifth temperature sensitive switch 110.5 and a fifth resistor 170.5, and/or a sixth parallel branch 180.6 with a sixth temperature sensitive switch 110.6 and a sixth resistor 170.6.

Due to the layout with parallel branches 180.1, 180.2, 180.3, 180.4, the sensor network 200' of the embodiment shown advantageously provides the function of a current divider. When one of the temperature sensitive switches 110.1, 110.2, 110.3, 110.4 is in an open position 110B, and the measurement current IM1, IM2, IM3, IM4 in the corresponding parallel branch 180.1, 180.2, 180.3, 180.4 is interrupted, the measurement current IM1, IM2, IM3, IM4 in all other, non-interrupted parallel branches 180.1, 180.2, 180.3, 180.4 will change, enabling the identification of the parallel branch 180.1, 180.2, 180.3, 180.4 where the measurement current IM is interrupted. Accordingly, the corresponding parallel branch 180.1, 180.2, 180.3, 180.4, where the temperature sensitive switch 110 is in its open position 110R, can be identified by detecting one of the measurement currents IM1, IM2, IM3, IM4.

In the shown embodiment, each parallel branch 180.1, 180.2, 180.3, 180.4 comprises a corresponding electric resistor 170.1, 170.2, 170.3, 170.4 each with a corresponding resistance value R1, R2, R3, R4, wherein each resistance value R1, R2, R3, R4 is different from the other resistance values R1, R2, R3, R4 in terms of its Ohmic value. For example, the resistance values R1, R2, R3, R4 can have the relation R1<R2<R3<R4.

The first measurement current IM1 in the corresponding first parallel branch 180.1 can be determined as follows:

$$IM1 = IT * \frac{R1}{R1 + R2 + R3 + R4}$$

When the first temperature sensitive switch 110.1 switches to its open position 110R, the first measurement current IM1 will be zero, as the first parallel branch 180.1 is interrupted. If one of the other temperature sensitive switches 110.2, 110.3, 110.4 switches to its open position 110B, the corresponding other measurement current IM2, IM3, IM4 will be zero. For example, if the fourth temperature sensitive switch 110.4 switches to its open position 110B, the fourth parallel branch 180.4 will be interrupted and the fourth resistor 170.4 with its fourth resistance value R4 will be rendered ineffective. In such case, the first measurement current would be determined as follows:

$$IM1' = IT * \frac{R1}{R1 + R2 + R3}$$

Hence, the further measurement current IM1' is greater than the measurement current IM1 above, since the total current IT is distributed on fewer parallel branches 180.1, 180.2, 180.3. Because of the individual, different resistance values R1, R2, R3, R4, it can be detected for each cylinder 140.1, 140.2, 140.3, 140.4 individually, whether the corresponding temperature sensitive switch 110.1, 110.2, 110.3, 110.4 has switched to its open position 110B. In the embodiment shown in FIG. 2B, the signal processing unit 210 is connected to the parallel electric circuit 248 via a measurement terminal 230 electrically connected to the fourth parallel branch 180.4. Consequently, the fourth measurement current IM4 determined by the signal processing unit 210 will be zero when the fourth temperature sensitive switch 110.4 is in its open position 110B.

When the first temperature sensitive switch 110.1 is in its open position 110B, the fourth measurement current IM4 will be as follows:

$$IM4' = IT * \frac{R4}{R2 + R3 + R4}$$

When the second temperature sensitive switch 110.2 is in its open position 110B, the fourth measurement current IM4 will be as follows:

$$IM4'' = IT * \frac{R4}{R1 + R3 + R4}$$

When the third temperature sensitive switch 110.3 is in its open position 110B, the fourth measurement current IM4 will be as follows:

$$IM4' = IT * \frac{R4}{R1 + R2 + R4}$$

Hence, it can be individually determined for each cylinder 140.1, 140.2, 140.3, 140.4, whether the corresponding temperature T1, T2, T3, T4 has reached or exceeded the switch temperature TS, and a first to fourth overheat signal SO1, SO2, SO3, SO4 can be output accordingly.

Even more, also if a combination of several temperature sensitive switches 110.1, 110.2, 110.3—given that they are arranged in parallel branches 180.1, 180.2, 180.3 not comprising the measurement terminal 230—switch to the open position 110B, such combination can be determined by an individual value of the fourth measurement current IM4.

In other embodiments, the measurement terminal 230 can be connected to any other parallel branch 180.1, 180.2, 180.3 of the sensor network 200'.

In optional embodiments, the sensor network 200 or the further sensor network 200' can comprise further temperature sensitive switches 110, in particular a fifth temperature sensitive switch 110.5 and/or a sixth temperature sensitive switch 110.6, as further described in the context of FIG. 3A and FIG. 3B.

FIG. 3A shows a preferred embodiment of a compressor assembly 200 in the form of a reciprocating compressor 202, comprising an amount of four cylinders 140.1, 140.2, 140.3, 140.4 in a front view, with the first cylinder 140.1 and the second cylinder 140.2 visible. The first cylinder 140.1 and the fourth cylinder 140.4 are arranged in a first V-shaped configuration V1. In an analog manner, the second cylinder 140.2 and the third cylinder 140.3 are also arranged in a second V-shaped configuration V2, as also visible in the side view of FIG. 3B. The compressor assembly 200 is driven by an electric motor 250, which is located symmetrically in between the first V-shaped configuration V1 and the second V-shaped configuration V2. In FIG. 3B, a third reciprocating piston 150.3 assigned to the third cylinder 140.3, as well as the crankshaft 154 are visible in an exemplary cut out view.

A cooling means 160 in the form of a fan 162 is assigned to each cylinder 140. Consequently, a first cooling means 160.1 in the form of a first fan 162.1 is assigned to the first cylinder 140.1. The first cooling means 160.1 is arranged on a first cylinder head region 142.1 of the first cylinder 140.1. The first temperature sensitive switch 110.1 comprises a first electric terminal 112.1 and a second electric terminal 140.1. The first temperature sensitive switch 110.1 is arranged at the first cylinder head region 142.1, in between the first cylinder head region 142.1 and the first cooling means 160.1.

The first temperatures sensitive switch 110.1 is adapted to switch to an open position 110B when a first temperature T1 reaches or exceeds a switch temperature TS, as described in FIG. 1A and FIG. 1B. This is particularly the case when the first cooling means 160.1 stops operating or is operating in an abnormal operating mode, in particular with reduced efficiency.

The above description referring to the first temperature sensitive switch 110.1 and the first cylinder 140.1 applies in an analog manner to the second, third and fourth temperature sensitive switch 110.2, 110.3, 110.4 as well as the second, third and fourth cylinder 140.2, 140.3, 140.4, respectively.

In particular, the compressor assembly 100 shown in FIG. 3A and FIG. 3B can comprise a sensor network 200 as shown in FIG. 2A or alternatively, a sensor network 200' as shown in FIG. 2B. In particular, the according sensor network 200, 200' can be achieved by the corresponding wiring of each first electric terminal 112 and each second electric terminal 114 of the temperature sensitive switches 110.

The compressor assembly 200 can optionally comprise a first temperature sensing device 122, configured to determine a motor temperature TM at the electric motor 250. Preferably, the first temperature sensing device 122 can be in the form of a fifth temperature sensitive switch 110.5, adapted to switch into an open position 110B when a further switch temperature TS2 is reached or exceeded. Depending on the architecture of the sensor network 200, 200', the fifth temperature sensitive switch 110.5 can be arranged in series with the other temperature sensitive switches 110 in a serial electrical circuit 246, or in a fifth parallel branch 180.5 in a parallel electrical circuit 248.

The compressor assembly 200 can optionally comprise a second temperature sensing device 124, configured to determine a power electronics temperature TP at a power electronics unit 260. In particular, the power electronics unit 260 can be in the form of or comprise an inverter 262, as shown in FIG. 3B. Preferably, the second temperature sensing device 124 can be in the form of a sixth temperature sensitive switch 110.6, adapted to switching to an open position 110 be when an even further switch temperature TS3 is reached or exceeded. Depending on the architecture of the sensor network 200, 200', the sixth temperature sensitive switch 110.6 can be arranged in series with the other temperature sensitive switches 110 in a serial electrical circuit 246, or in a sixth parallel branch 180.6 in a parallel electrical circuit 248.

FIG. 4 shows a schematic view of a vehicle 1000 comprising a compressor assembly 100 according to the concept of the invention. The vehicle 1000 can be a conventional combustion vehicle 1001 with a drive means 1100 in the form of a combustion engine 1101. In other embodiments, the vehicle 1000 can be an electric vehicle 1002, with drive means 1100 in the form of one or more electric drive motors 1102. In again other embodiments, the vehicle 1000 can be a hybrid vehicle 1004, with a drive means 1100 combining a combustion engine 1101 and one or more electric drive motors 1102. The drive means 1100 is adapted to provide a drive motion MD for propelling the vehicle 1000.

The vehicle 1000 further comprises an electric energy source 1200, in particular a vehicle battery 1202 such as a traction battery 1204 and/or a system supply battery 1206. In other embodiments, the electric energy source 1200 can alternatively or additionally comprise a fuel cell 1208. The electric energy source 1200 is adapted to provide electric energy E to the one or more electric drive motors 1102 and/or the electric motor 250 of the compressor assembly 200. Independent of the mode of propulsion, the vehicle 1000 can be a commercial vehicle 1012 or a passenger vehicle 1014.

The depicted vehicle 1000 exemplarily comprises two axles 530, a front axle 532 and a rear axle 534. Wheels 540 are attached to the front axle 532 as well as to the rear axle 534. In other embodiments, the drivetrain can be different, such as an individual electric motor 1102 assigned to each axle 530 or wheel 540. In other embodiments, the number of axles 530 and wheels 540 can vary.

The vehicle 1000 comprises an air supply system 800 with a compressor assembly 100. The main components of the compressor assembly 100 are shown schematically, with a rotational axis AR of the crankshaft 154 indicated. The orientation of the rotational axis AR and thus, the modular compressor assembly 100, can vary depending on the available space and installation position in the vehicle 1000, and is here—as an example—substantially parallel to the vehicle 1000.

The air supply system comprises at least one pneumatic consumer 810, such as a pneumatic brake system 812 and/or an air suspension system 814 and/or a sensor cleaning system 816.

The signal processing unit 210 of the sensor network 100 is configured to communicate with an electronic control unit 700 of the vehicle 1000, in order to provide an overheat signal SO to the electronic control unit 700. In particular, the signal processing unit 210 is connected to the electronic control unit 700 by means of a signal line 740.

The electronic control unit 700 is again configured to provide an alarm indication 722 in dependence of the overheat signal SO. The vehicle 1000 can comprise an alarm indication device 720, adapted to output the alarm indication 722. The alarm indication device 720 is preferably adapted to output an alarm message 724 and for this purpose can comprise a display screen. In other embodiments, the alarm indication device 720 can comprise other indication devices, such as a lightbulb, an audio speaker or the like output means for indicating a visual and/or aural alarm indication 722.

LIST OF REFERENCE SIGNS (PART OF THE DESCRIPTION)

100 compressor assembly
100' further compressor assembly
110 temperature sensitive switch
110.1 first temperature sensitive switch
110.2 second temperature sensitive switch
110.3 third temperature sensitive switch
110.4 fourth temperature sensitive switch
110.5 fifth temperature sensitive switch
110.6 sixth temperature sensitive switch
110A closed position of the temperature sensitive switch
110B open position of the temperature sensitive switch
111 bimetallic switch
112 first electric terminal
112.1 first electric terminal of the first temperature sensitive switch
112.2 first electric terminal of the second temperature sensitive switch
112.3 first electric terminal of the third temperature sensitive switch
112.4 first electric terminal of the fourth temperature sensitive switch
114 second electric terminal
114.1 second electric terminal of the first temperature sensitive switch
114.2 second electric terminal of the second temperature sensitive switch
114.3 second electric terminal of the third temperature sensitive switch
114.4 second electric terminal of the fourth temperature sensitive switch
115 contact bridge
116 first material layer
118 second material layer
119 contact foundation
122 first temperature sensing device
124 second temperature sensing device
140 cylinder
140.1 first cylinder
140.2 second cylinder
140.3 third cylinder
140.4 fourth cylinder
142.1 first cylinder head region
150 contact bridge
150.3 third reciprocating piston
154 crankshaft
160 cooling means
160.1 first cooling means
162 fan
162.1 first fan
170.1 first electric resistor
170.2 second electric resistor
170.3 third electric resistor
170.4 fourth electric resistor
180 parallel branch
180.1 first parallel branch
180.2 second parallel branch
180.3 third parallel branch
180.4 fourth parallel branch
180.5 fifth parallel branch
180.6 sixth parallel branch
200 sensor network
200' further sensor network
202 reciprocating compressor
210 signal processing unit
230 measurement terminal
240 electric source
242 first source terminal
244 second source terminal
246 serial electric circuit
248 parallel electric circuit
250 electric motor
260 power electronics unit
262 inverter
530 axle
532 front axle
534 rear axle
540 wheel
700 electronic control unit
720 alarm indication device
722 alarm indication
724 alarm message
740 signal line
800 air supply system
810 pneumatic consumer
812 pneumatic brake system
814 air suspension system
816 sensor cleaning system
1000 vehicle
1001 combustion vehicle
1002 electric vehicle
1004 hybrid vehicle
1012 commercial vehicle
1014 passenger vehicle
1100 drive means
1101 combustion engine
1102 electric drive motor
1200 electric energy source
1202 vehicle battery
1204 traction battery
1206 system supply battery
1208 fuel cell AR rotational axis
E electric energy
H heat flow
IM measurement current
IT total current
K contact point
MD drive motion
MO opening movement
SO overheat signal
T temperature
TC greater temperature coefficient
TM motor temperature
TP power electronics temperature
TS switch temperature
TS2 further switch temperature
TS3 even further switch temperature
UM measurement voltage
V1 first V-shaped configuration of cylinders
V2 second V-shaped configuration of cylinders

The invention claimed is:

1. A compressor assembly for a commercial vehicle, comprising:
- a plurality of cylinders, wherein each cylinder accommodates a reciprocating piston, wherein the reciprocating piston is operatively coupled to a crankshaft, and
- a plurality of cooling means arranged at a cylinder head region of the cylinder, wherein one specific cooling means is assigned to one cylinder, respectively,
- wherein the compressor assembly comprises:
- a sensor network comprising a plurality of temperature sensitive switches, wherein:
- each temperature sensitive switch is assigned to a cylinder, and
- each temperature sensitive switch comprises a first electric terminal and a second electric terminal and is adapted to switch from a closed position to an open position in which an electric connection between the first electric terminal and the second electric terminal is interrupted when a switch temperature at the temperature sensitive switch is reached or exceeded, and
- the sensor network is adapted to provide an overheat signal when at least one temperature sensitive switch is in the open position.

2. A compressor assembly according to claim 1, wherein the sensor network further comprises a first temperature sensing device configured to determine a motor temperature at an electric motor of the compressor assembly and/or a second temperature sensing device, configured to determine a power electronics temperature at a power electronics unit of the compressor assembly.

3. A compressor assembly according to claim 1, wherein the compressor assembly comprises an electric motor, adapted to drive the crankshaft.

4. A compressor assembly according to claim 1, wherein the temperature sensitive switch is a bimetallic switch.

5. A compressor assembly according to claim 1, wherein the switch temperature is defined to be in a range from 140° C. to 260° C.

6. A compressor assembly according to claim 1, wherein the temperature sensitive switch is arranged in the cylinder head region or between the cylinder head region and the cooling means.

7. A compressor assembly according to claim 1, wherein the temperature sensitive switches of the sensor network are electrically connected in series, and the sensor network is configured to provide the overheat signal if a measurement voltage and/or a measurement current is not present at a measurement terminal.

8. A compressor assembly according to claim 1, wherein the temperature sensitive switches of the sensor network are electrically connected in parallel,
- each temperature sensitive switch is arranged in a parallel branch of the sensor network,
- a measurement terminal is arranged in one of the parallel branches, and
- the sensor network is configured to provide the overheat signal if a measurement current at the measurement terminal changes.

9. A compressor assembly according to claim 8, wherein at least two parallel branches comprise a resistor with a resistance, wherein a first resistance of a first resistor in a first parallel branch differs from a second resistance of a second resistor in a second parallel branch.

10. A compressor assembly according to claim 7, wherein the overheat signal is representative for the measurement current at the measurement terminal of the temperature sensitive switch where the switch temperature is exceeded.

11. A compressor assembly according to claim 1, wherein the sensor network comprises a signal processing unit, adapted to provide the overheat signal in dependence of the measurement voltage and/or a measurement current, wherein
- preferably the signal processing unit is connected to an electronic control unit of the commercial vehicle.

12. An air supply system for a commercial vehicle, comprising a compressor assembly according to claim 1.

13. A commercial vehicle, comprising:
- at least one pneumatic consumer, and
- a compressor assembly according to claim 1.

14. A commercial vehicle according to claim 13, comprising an electronic control unit connected to the sensor network, in particular to a signal processing unit, adapted to receive an overheat signal and to provide an alarm indication via an alarm indication device, preferably to display an alarm message, in dependence of the overheat signal.

* * * * *